(12) United States Patent
Murthy et al.

(10) Patent No.: US 7,461,074 B2
(45) Date of Patent: Dec. 2, 2008

(54) METHOD AND SYSTEM FOR FLEXIBLE SECTIONING OF XML DATA IN A DATABASE SYSTEM

(75) Inventors: Ravi Murthy, Fremont, CA (US); Eric Sedlar, San Francisco, CA (US); Sivasankaran Chandrasekar, Palo Alto, CA (US); Ashish Thusoo, Fremont, CA (US); Nipun Agarwal, Santa Clara, CA (US); Sreedhar Mukkamalla, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 279 days.

(21) Appl. No.: 11/083,828

(22) Filed: Mar. 18, 2005

(65) Prior Publication Data

US 2005/0228818 A1 Oct. 13, 2005

Related U.S. Application Data

(60) Provisional application No. 60/590,309, filed on Jul. 21, 2004, provisional application No. 60/560,927, filed on Apr. 9, 2004, provisional application No. 60/580,445, filed on Jun. 16, 2004.

(51) Int. Cl.
*G06F 17/30* (2006.01)
(52) U.S. Cl. .............................. 707/101; 707/E17.124; 715/234
(58) Field of Classification Search ...................... 707/3, 707/101, E17.124; 715/234
See application file for complete search history.

(56) References Cited

U.S. PATENT DOCUMENTS 5,210,686 A 5/1993 Jernigan
5,369,763 A 11/1994 Biles
5,410,691 A 4/1995 Taylor
5,454,101 A 9/1995 Mackay et al.
5,467,471 A 11/1995 Bader
5,524,240 A 6/1996 Barbara et al.

(Continued)

FOREIGN PATENT DOCUMENTS

WO WO 01/42881 A2 6/2001

(Continued)

OTHER PUBLICATIONS

International Preliminary Examining Authority, "Notification of Transmittal of the International Preliminary Report of Patentability," PCT/US2005/020795, dated Aug. 7, 2006, 10 pages.

(Continued)

*Primary Examiner*—Leslie Wong
(74) *Attorney, Agent, or Firm*—Hickman Palermo Truong & Becker LLP (57) ABSTRACT

A method and system are provided for flexibly sectioning XML documents stored in a relational database system. The method includes obtaining a set of sectioning rules; receiving an XML document that is to be stored in the relational database system; and identifying a storage location for each node in the XML document based on the set of sectioning rules. The sectioning rules can also be used to determine which tables in the relational database should be queried when a query is received, and to determine which tables in the relational database should be updated when a command to update stored XML data is received.

34 Claims, 4 Drawing Sheets

U.S. PATENT DOCUMENTS

| | | | |
|---|---|---|---|
| 5,530,849 | A | 6/1996 | Hanushevsky et al. |
| 5,544,360 | A | 8/1996 | Lewak et al. |
| 5,546,571 | A | 8/1996 | Shan et al. |
| 5,568,640 | A | 10/1996 | Nishiyama et al. |
| 5,643,633 | A | 7/1997 | Telford et al. |
| 5,680,614 | A | 10/1997 | Bakuya et al. |
| 5,701,467 | A | 12/1997 | Freeston |
| 5,838,965 | A | 11/1998 | Kavanagh et al. |
| 5,842,212 | A | 11/1998 | Balluvio et al. |
| 5,870,590 | A | 2/1999 | Kita et al. |
| 5,917,492 | A | 6/1999 | Bereiter et al. |
| 5,921,582 | A | 7/1999 | Gusack |
| 5,974,407 | A | 10/1999 | Sacks |
| 6,018,747 | A | 1/2000 | Burns et al. |
| 6,101,500 | A | 8/2000 | Lau |
| 6,111,578 | A | 8/2000 | Tesler |
| 6,112,209 | A | 8/2000 | Gusack |
| 6,182,121 | B1 | 1/2001 | Wlaschin |
| 6,192,273 | B1 | 2/2001 | Igel et al. |
| 6,192,373 | B1 | 2/2001 | Haegele |
| 6,208,993 | B1 | 3/2001 | Shadmon |
| 6,236,988 | B1 | 5/2001 | Aldred |
| 6,279,007 | B1 | 8/2001 | Uppala |
| 6,330,573 | B1 | 12/2001 | Salisbury et al. |
| 6,370,537 | B1 | 4/2002 | Gilbert et al. |
| 6,427,123 | B1 | 7/2002 | Sedlar |
| 6,519,597 | B1 | 2/2003 | Cheng et al. |
| 6,584,459 | B1 | 6/2003 | Chang et al. |
| 6,598,055 | B1 | 7/2003 | Keesey et al. |
| 6,604,100 | B1 | 8/2003 | Fernandez et al. |
| 6,636,845 | B2 | 10/2003 | Chau et al. |
| 6,643,633 | B2 * | 11/2003 | Chau et al. ............ 707/1 |
| 6,697,805 | B1 | 2/2004 | Choquier et al. |
| 6,725,212 | B2 | 4/2004 | Couch et al. |
| 6,996,571 | B2 * | 2/2006 | McConnell ............ 707/101 |
| 7,031,956 | B1 * | 4/2006 | Lee et al. ............ 707/3 |
| 7,096,224 | B2 * | 8/2006 | Murthy et al. ............ 707/100 |
| 7,139,746 | B2 | 11/2006 | Shin et al. |
| 7,162,485 | B2 | 1/2007 | Gottlob et al. |
| 7,171,404 | B2 | 1/2007 | Lindblad et al. |
| 7,171,407 | B2 | 1/2007 | Barton et al. |
| 7,216,127 | B2 | 5/2007 | Auerbach |
| 2001/0049675 | A1 | 12/2001 | Mandler et al. |
| 2002/0078068 | A1 | 6/2002 | Krishnaprasad et al. |
| 2002/0152267 | A1 | 10/2002 | Lennon |
| 2002/0184401 | A1 | 12/2002 | Kadel, Jr. et al. |
| 2002/0188613 | A1 | 12/2002 | Chakraborty et al. |
| 2003/0065659 | A1 | 4/2003 | Agarwal et al. |
| 2003/0101194 | A1 | 5/2003 | Rys et al. |
| 2003/0131051 | A1 | 7/2003 | Lection et al. |
| 2003/0177341 | A1 | 9/2003 | Devillers |
| 2003/0212662 | A1 | 11/2003 | Shin et al. |
| 2003/0212664 | A1 | 11/2003 | Breining et al. |
| 2004/0010752 | A1 | 1/2004 | Chan et al. |
| 2004/0044659 | A1 | 3/2004 | Judd et al. |
| 2004/0064466 | A1 | 4/2004 | Manikutty et al. |
| 2004/0088320 | A1 | 5/2004 | Perry |
| 2004/0103105 | A1 * | 5/2004 | Lindblad et al. ............ 707/100 |
| 2004/0148278 | A1 | 7/2004 | Milo et al. |
| 2004/0167864 | A1 | 8/2004 | Wang et al. |
| 2004/0205551 | A1 | 10/2004 | Santos |
| 2004/0267760 | A1 | 12/2004 | Brundage et al. |
| 2005/0038688 | A1 | 2/2005 | Collins et al. |
| 2005/0050016 | A1 | 3/2005 | Stanoi et al. |
| 2005/0091188 | A1 * | 4/2005 | Pal et al. ............ 707/1 |
| 2005/0097084 | A1 * | 5/2005 | Balmin et al. ............ 707/3 |
| 2005/0108630 | A1 * | 5/2005 | Wasson et al. ............ 715/513 |
| 2005/0120031 | A1 | 6/2005 | Ishii |
| 2005/0228792 | A1 | 10/2005 | Chandrasekaran et al. ..... 707/9 |
| 2005/0228818 | A1 | 10/2005 | Murthy et al. |
| 2005/0229158 | A1 | 10/2005 | Thusoo et al. |
| 2005/0257201 | A1 | 11/2005 | Rose et al. |
| 2005/0289125 | A1 | 12/2005 | Liu et al. |
| 2006/0021246 | A1 | 2/2006 | Schulze et al. |

FOREIGN PATENT DOCUMENTS

| | | |
|---|---|---|
| WO | WO 01/59602 A1 | 8/2001 |
| WO | WO 01/61566 A1 | 8/2001 |
| WO | WO 03/027908 A2 | 4/2003 |
| WO | WO 03/107576 A2 | 12/2003 |
| WO | WO 2006/026534 A2 | 3/2006 |

OTHER PUBLICATIONS

International Preliminary Examining Authority, "Written Opinion of the International Preliminary Examining Authority," PCT/US2005/020795, received May 31, 2006, 5 pages.

Claims, PCT/US2005/020795, 3 pages.

W3C, "XML Fragment Interchange," W3C Working Draft, Jun. 30, 1999, XP-002167090, 17 pages.

Kudrass, Thomas, "Management of XML Documents Without Schema in Relational Database Systems," Information and Software Technology, vol. 44, No. 4, Mar. 31, 2002, XP-004347776, pp. 269-275.

International Searching Authority, "Notification of Transmittal of the International Search Report and the Written Opinion of the International Searching Authority, or the Declaration," PCT/US2005/011763, dated Aug. 6, 2005, 12 pages.

Current Claims, PCT/US2005/011763, 4 pages.

Cooper, Brian F. et al., "A Fast Index for Semistructured Data ," Proceeding of the International Conference on Very Large Databases, 2001, XP-002303292, pp. 341-350.

McHugh, Jason, et al. "Indexing Semistructured Data," Stanford Science Department, 1998, XP-002248313, pp. 1-21.

McHugh, Jason, et al., "Query Optimization for XML," Proceeding of the 25th VLDB Conference, Edinburgh, Scotland, 1999, XP-002333353, pp. 315-326.

Bourret, R. et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

Braga, Daniele et al., "A Graphical Environment to Query XML Data with Query," Proceedings of the Fourth International Conference on Web Information Systems Engineering (WISE '03), 2003, IEEE, 10 pages.

Chae, Mi-Ok et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Cheng, Josephine et al., "IBM DB2 XML Extender," IEEE, ICDE '00 Conference, San Diego, Feb. 2000, 128 pages.

Drapner, Denise, Mapping Between XML and Relational Data [online], Feb. 6, 2004 [retrieved on Aug. 17, 2004]. Retrieved from the Internet: <http://www.awprofessional.com/articles/printerfriendly.asp?p=169590>.

Jonah, Kevin, Databases Tag Along with XML [online], Jul. 1, 2002, [retrieved on Aug. 17, 2004]. Retrieved from the Internet: <http://www.gcn.com/21_17/guide/19148-1.html>.

Lehmann, Mike, From XML to Storage and Back [online], [retrieved on Aug. 17, 2004]. Retrieved from the Internet: <http://www.oracle.com/technology/oramag/oracle/03-mar/o23xml.html>.

Michell, Nancy, Data Shredding, Updating the Status Bar, and More [online], Feb. 2003, [retrieved on Aug. 17, 2004]. Retrieved from the Internet: <http://msdn.microsoft.com/msdnmag/issues/03/03/WebQA/>.

Noser, Hansrudi et al., "Dynamic 3D Visualization of Database-Defined Tree Structures on the WWW by Using Rewriting Systems," 2000, IEEE, XP-002262516, pp. 247-254.

Vorthmann, S. et al. "Beyond Schemas, Schema Adjuncts and the Outside World," Markup Languages, Online!, vol. 2, No. 3, Jun. 2000, pp. 1-8.

W3C, XML Path Language (XPath) Version 1.0, W3C Recommendation Nov. 16, 1999 [online] Copyright 1999 [retrieved on Aug. 16, 2004]. Retrieved from the Internet: <http://www.w3.org/TR/xpath>.

PCT/US2007/010163, Notification of Transmittal of The International Search Report and The Written Opinion of The International Searching Authority, mailed Oct. 12, 2007, 12 pages.

Claims, Foreign Application No. 200580018627.9, 3 pages.

State Intellectual Property Office of P.R.C., "Notification of the First Office Action", Foreign Application No. 200580018627.9, mailed Oct. 12, 2007, 9 pages.

Shankar Pal et al., "Indexing XML Data Stored in a Relational Database", Proceedings of the 30th VLDB Conference, 2004, 12 pages.

MacKenzie et al., "Finding Files", FindUtils, Version 4.1.2, Source Code, GNU.org, Nov. 1997, source files, code. C, 22 pages.

Cormen et al., "Introduction to Algorithms", MIT Press, 2001, 2nd Edition, 4 pages.

European Patent Office, "Communication pursuant to Article 94 (3) EPC", European patent application 05732473.3-1225, dated Feb. 4, 2008, 7 pages.

State Intellectual Property Office of P.R.C., "Notification of the First Office Action", European patent application 2005800186273.9, dated Oct. 12, 2007, 9 pages.

Claims, European patent application 2005800186273.9, 3 pages.

Claims, European patent application 05732473.3-1225, 3 pages.

\* cited by examiner

METHOD AND SYSTEM FOR FLEXIBLE SECTIONING OF XML DATA IN A DATABASE SYSTEM

PRIORITY CLAIM

This application claims priority to U.S. Provisional Patent Application Ser. No. 60/590,309, entitled EFFICIENT QUERIBILITY AND MANAGIBILITY OF AN XML INDEX WITH PATH SUBSETTING, filed on Jul. 21, 2004, the contents of which are herein incorporated by reference in their entirety for all purposes.

This application claims priority to U.S. Provisional Patent Application No. 60/560,927 entitled XML INDEX FOR XML DATA STORED IN VARIOUS STORAGE FORMATS, filed on Apr. 9, 2004, the contents of which are herein incorporated by reference in their entirety for all purposes.

This application claims priority to U.S. Provisional Patent Application No. 60/580,445 entitled XML INDEX FOR XML DATA STORED IN VARIOUS STORAGE FORMATS, filed on Jun. 16, 2004, the contents of which are herein incorporated by reference in their entirety for all purposes.

FIELD OF THE INVENTION

The present invention relates to managing information in a database and, more specifically, sectioning extensible Markup Language (XML) data in XML documents into relational database tables according to user-defined rules, even in the absence of an XML schema.

BACKGROUND

In recent years, XML is increasingly being used to represent various kinds of content. XML has been used to represent structured data and semi-structured data as well as unstructured documents. In addition, XML documents are being stored and managed within a database system, where the XML data in the documents can be queried.

In many cases, the XML documents stored in a database system can be quite large. It is not uncommon for an XML document to require hundreds of megabytes of storage. Furthermore, the number of XML documents stored in a database system may also be very large, numbering into the millions. In general, database systems are not able to provide efficient support for querying, managing and updating such large collections of large XML documents.

XML documents that are stored and managed in a relational database are typically stored as unstructured serialized data in some form of a LOB (Large Object) datatype. For example, an XML document may be stored in a CLOB (Character LOB) or a BLOB (Binary LOB) column in a relational table. Unfortunately, there are several problems that arise when there are large numbers of large LOBs in such tables. In particular, executing queries against the stored XML data or updating the stored XML data are problematic.

Most known methods for querying XML data include some variation of XPath. XPath is a language that describes a way to locate and process items in XML documents by using an addressing syntax based on a path through the document's logical structure or hierarchy. The portion of an XML document identified by an XPath "path expression" is the portion that resides, within the structure of the XML document, at the end of any path that matches the path expression.

A query that uses a path expression to identify one or more specific pieces of XML data is referred to herein as a path-based query. The process of determining which XML data corresponds to the path designated in a path-based query is referred to as "evaluating" the path expression. To evaluate a path-based query, the database system finds all fragments in all XML documents stored in the database system that match the path expression.

If the schema of the stored documents is not known, a database system may use ad-hoc mechanisms to evaluate path-based queries. For example, a database system may satisfy an XPath query by performing a full scan of all stored XML documents to find all fragments in all documents matching a given XPath. While all path-based queries can be evaluated with a full scan of all stored XML documents, the implementation would be very slow, even if only a small number of documents actually match the path expression.

Database indexes enable data to be searched without a sequential scan of all of the data. However, even with secondary indexes and XML indexes, the performance of a path-based query can be quite poor because the indexes themselves can become very large. For example, when an index is implemented using a B-tree, a large number of entries can cause significant degradation in index performance as the level of the B-tree increases.

In addition to poor query performance, updating an XML document in a database system can be difficult. For example, when a user updates a small portion of a large XML document that is stored in a database system, typically the entire document needs to be updated with the new values. In addition to significant performance impact, this also generates a large amount of database logging information needed to maintain the transactional property of databases. Furthermore, when a user updates an XML document stored in a CLOB column, the entire document is "locked" until the transaction is committed. That is, no other user is allowed to update the same document during this period of time, even if the other user desires to update a completely different or unrelated portion of the XML document. The constraints imposed by locking severely limit the concurrency of XML-based applications.

If an XML document conforms to a known, well-defined schema, techniques to "shred" the document into relational database tables, columns and rows are known. Shredding allows the structure and data types used in XML documents to optimize XPath queries, as queries can take advantage of well-known relational database techniques if the data is in relational database tables, rows and columns. In addition, updating XML data in relational database tables is straightforward. However, while XML shredding provides a solution to some of the XML data management issues described above, known shredding techniques have several limitations.

Known shredding techniques require a well-defined schema. In the absence of a well-defined schema, known shredding processes cannot determine what tables, rows and columns in which to place the XML data. In addition, known shredding techniques may not work if the XML documents conform to many different schemas.

Furthermore, the table, row, and column format is rigidly determined by the schema, and placement of data within the tables, rows and columns is inflexible. Generally, all data in an XML document is automatically shredded into tables according to the document's schema. The number of tables and columns is tightly correlated to the complexity of the schema with respect to the number of element definitions, etc. Typically, each section of an XML document is stored in a separate table. In the case of complex schemas, known shredding techniques result in an unmanageable large number of tables with numerous columns. The proliferation of tables presents serious query and update problems.

With known shredding techniques, it is not possible to "shred" only the portion of the XML documents that are more likely to be used in queries. If an XML document is shredded, all XML data in the document is shredded according to the document's schema.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawing, in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The techniques disclosed herein allow XML documents to be selectively shredded based on user-specified criteria that define how to section the data. In particular, users can specify the criteria for sectioning XML documents using XPath expressions. In addition, users can specify the table in which sections matching specified XPath expressions are to be stored. Significantly, users can specify sectioning criteria for sectioning an XML document that does not have a well-defined schema into relational database tables.

EXAMPLE XML DOCUMENTS

For the purpose of explanation, examples shall be given hereafter with reference to the following two XML documents:

```
po1.xml
<PurchaseOrder>
    <Reference>SBELL-2002100912333601PDT</Reference>
    <LineItems>
        <Action>
            <User>SVOLLMAN</User>
        </Action>
    </LineItems>
    ....
</PurchaseOrder>
po2.xml
```

-continued

```
<PurchaseOrder>
    <Reference>ABEL-20021127121040897PST</Reference>
    <LineItems>
        <Action>
            <User>ZLOTKEY</User>
        </Action>
        <Action>
            <User>KING</User>
        </Action>
    </LineItems>
    ....
</PurchaseOrder>
```

As indicated above, po1.xml and po2.xml are merely two examples of XML documents. The techniques described herein are not limited to XML documents having any particular types, structure or content. Examples shall be given hereafter of how such documents could be flexibly sectioned into relational database tables according to user-specified sectioning criteria.

Flexible Set of XML Data Sectioning Rules

Instead of automatically sectioning all data in an XML document according to its schema, the present invention allows XML documents to be sectioned according to user-specified criteria. By allowing users to specify paths and corresponding relational database tables for sectioning, any document can be "shredded", even those that do not conform to a well-defined schema.

In one embodiment, a user can enter criteria that will be used to section XML data in XML documents. In one embodiment, these sectioning criteria may be specified using XPath expressions. Relational database tables in which sectioned XML data is to be stored may be specified with the sectioning criteria.

The sectioning criteria, i.e. set of sectioning rules, can be entered by a user through an interactive user interface, through a file, or any other appropriate method known to those skilled in the art. Any format that allows users to specify a path expression for sectioning XML data, and a storage location within a relational database for storing XML data fragments that correspond to the specified path expression can be used. Typically, the storage location specified in a rule will identify a section table in a relational database system, but any location can be specified.

Alternatively, sectioning criteria can be specified as annotations in an XML schema. In this embodiment, the sectioning rules specified with the XML schema can be used to flexibly section the XML document. By specifying sectioning rules with the XML schema, instead of automatically shredding each section of the XML data in a separate table, potentially resulting in table proliferation, it is possible to intelligently shred related sections of XML data into section tables that can be commonly queried and updated.

One example of the format or syntax that can be used to enter an XML sectioning rule is:

Section-XPath=>Section-Table

This particular format is not required; any format that allows the creation of an association between a path expression and a section table can be used.

For example, a user may enter sectioning rule EX1:

//Address=>ADDR_TABLE

In this example, all nodes in an XML document that match XPath "//Address" of rule EX1 are sectioned into the table named or identified by "ADDR_TABLE." Any type of identifier that identifies a table in the relational database system can be used As another example, a user may enter the following sectioning rule EX2:

/PurchaseOrder=>PURCHASE_ORDER_TABLE

In this example, all nodes in an XML document that match XPath "/PurchaseOrder" are sectioned into the "PURCHASE_ORDER_TABLE" table.

As another example, a user may enter sectioning rule EX3:

/PurchaseOrder/LineItems=>LINEITEM_TABLE

In this example, all nodes in an XML document that match the XPath "/PurchaseOrder/LineItems" are sectioned into the "LINEITEM_TABLE" table.

As shown, the sectioning rules are not dependent on any schema and hence can be specified even in the absence of well-defined schemas.

In one embodiment, the same sectioning table can store XML data corresponding to multiple XPaths. This is an important feature, as instead of requiring a separate table for each section as in known shredding techniques, related sections of XML data can be stored together, thereby reducing the number of tables and further increasing efficiency and performance. This feature allows the creation of a flexible set of storage tables based on a user's knowledge or expectation of query and update workload. The number of tables is not correlated to the XML schema complexity in terms of the number of element definitions. In the present invention, if elements matching a set of XPaths are commonly queried and updated, then they can all be mapped to the same section table. The reduced number of tables achieved through use of the techniques of the present invention allows for easier and more efficient XML document management, in particular XML data querying and updating.

For example, ADDR_TABLE in example sectioning rule EX1 above can be configured to store <USAddr> and <IntlAddr> elements in addition to <Address> elements through the set of sectioning rules EX4:

//USAddr=>ADDR_TABLE
//IntlAddr=>ADDR_TABLE

In one embodiment, wildcards and other XPath constructs can be used when specifying sectioning rules. For example, sectioning rule EX5 below maps any child of element /Employee/Description to specified table DESC_CHILD_TABLE:

/Employee/Description/*=>DESC_CHILD_TABLE

When an XML document is added to a database, in one embodiment it is automatically sectioned based on a set of sectioning rules previously entered by a user. Alternatively, the set of sectioning rules may be obtained from annotations in the XML schema associated with the XML document. The XPaths in the set of sectioning rules are applied to the incoming XML document, and the element nodes in the document matching the specified XPaths are stored in the corresponding section tables.

In one embodiment, if an element node matches more than one sectioning rule, the element node is stored in the section table specified by the first matching rule. That is, the order that the sectioning rules are entered and stored is significant, as XML data will be sectioned according to the first matching sectioning rule. In this embodiment, the sectioning rules may be stored in an ordered list.

Each row of a section table stores matching XML fragments from the XML documents. That is, a fragment of XML data corresponding to the element that matches the XPath in the sectioning rule is stored in the section table specified in the matching rule. The XML fragment can be stored in any format, such as a CLOB or a binary format. In addition, the row preferably stores a fragment identifier. For example, the "order key" and "path-id" of the node could be stored. These concepts were introduced in the co-pending application U.S. patent application Ser. No. 10/884,311, entitled INDEX FOR ACCESSING XML DATA, filed on Jul. 2, 2004, previously incorporated by reference, hereinafter referenced as the "XML Index application." Techniques disclosed in the XML Index application are described in more detail below.

Each row of a section table may also contain information to link it to its parent section. Specifically, section tables include columns that store corresponding parent table IDs and parent section identifiers. In place of section data, a section "reference", or logical pointer, is inserted into the parent section.

Method for Flexibly Sectioning XML Documents

Figure 1:
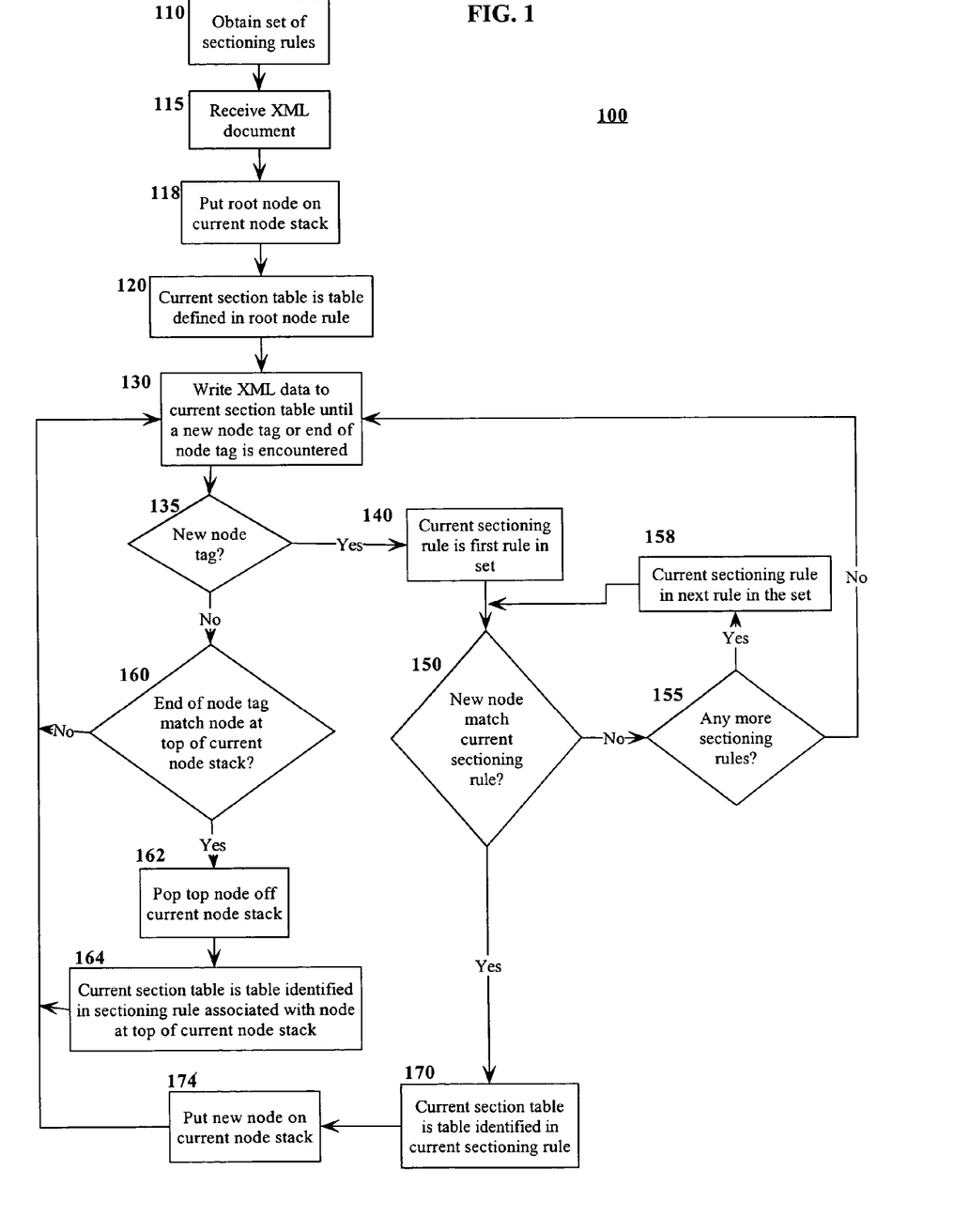
FIG. 1 is a high-level flowchart illustrating steps for sectioning XML documents according to user-specified criteria.

FIG. 1 illustrates a high level flowchart illustrating one embodiment of a method for flexibly sectioning XML documents according to a set of sectioning rules. FIG. 1 will be described using the example of sectioning XML document po1.xml, given above, using the set of sectioning rules PO1RULES:

/=>ROOT_TAB (Root section table)
//Action=>ACTION_TAB

In the embodiment shown in FIG. 1, there is a "root section table" that corresponds to the root element of the XML document. This is the table that will store the top-level section of the document. XML data is written to this section table until a node that matches a sectioning rule is encountered. At that point, XML data is written to the sectioning table in the matching rule, which may or may not be the same table. XML data is written to this section table until either the entire fragment corresponding to this node is written (i.e. a matching end tag is reached), or another node that matches another sectioning rule is encountered.

As shown, process 100 starts at step 110, in which a set of sectioning rules is obtained. This set may be interactively entered by a user, or may be read from a file. Alternatively, the set of sectioning rules may be specified as annotations in an XML schema. Any method known to those skilled in the art can be used to obtain a set of sectioning rules.

At step 115, an XML document that is to be sectioned and stored in a database system is received. At step 118, a current node stack is initialized with the root node "/". The current node stack is used to track the section tables to which XML data is written, with the top of the stack being the "current" section table. In this way, the process of FIG. 1 handles nested nodes that match multiple rules in the set of sectioning rules. There are many ways of implementing a stack, and the techniques disclosed herein are not limited to any particular implementation. In addition, although the embodiment shown in FIG. 1 uses a stack to keep track of the current section table, there are alternative methods of tracking which nodes are currently being processed, and to which section table XML data is currently being written.

The current section table is set to be the table defined in the sectioning rule for the root node at step 120. In this example, the current section table is set to "ROOT_TAB." In this example, the root section table is defined in the set of sectioning rules. However, the root section table may be defined separately from the set of sectioning rules. For example, a default root section table may be used if no root section table is defined in the set of sectioning rules. The root section table is used to store the top-level section of the XML document.

XML data is written to the current section table at step 130. At this point, the current section table is the root section table ROOT_TAB. The XML data is examined as it is written, and when a start tag or end tag is encountered, these tags are examined according to the steps of FIG. 1 to determine if data should continue to be written to the current section table, or should be written to a different section table.

If it is determined at step 135 that a start tag has been encountered, then it will be determined whether the new node starting with the start tag matches one of the sectioning rules. At step 140, the "current" sectioning rule is set to the first rule in the set of sectioning rules. In the embodiment shown in FIG. 1, the comparison between nodes and rules always starts with the first rule in the set of sectioning rules, so that every node will be sectioned according to the first rule that matches the node. In this embodiment, the order of the rules is significant, as a node may potentially match several rules.

During processing, if it is determined at step 150 that the path of the new node does not match the path expression in the current rule, then the process continues to step 155, wherein it is determined whether there are any more rules in the set of sectioning rules. If there are more rules, then the next rule in the set becomes the current sectioning rule at step 158. The new node is then compared to this current rule at step 150, and so forth.

In the embodiment shown in FIG. 1, if every rule in the set of sectioning rules is compared to the new node without any matches, then the process will continue back to step 130. As the node just encountered did not match any sectioning rules, then XML data will continue to be written to the same section table as before the node was encountered.

For example, in the XML document po1.xml, the first node (start tag) encountered is <PurchaseOrder>. "PurchaseOrder" does not match any of the sectioning rules in set PO1RULES, and therefore, the XML data associated with the PurchaseOrder node is stored in the root section table, ROOT_TAB. Likewise, the next node, "Reference", does not match any of the sectioning rules, and XML data for the Reference node is also stored in the root section table. Likewise, the next node, "LineItems", does not match any of the sectioning rules, and LineItems XML data is also stored in the root section table until the Action node is encountered.

When the <Action> node is encountered, at step 150, it will match the second sectioning rule in the set of sectioning rules PO1RULES, and therefore the process will continue to step 170, where the current section table is set to the table in the matching section rule. In this example, the current section table is set to "ACTION_TAB", from the corresponding section rule for the "//Action" path.

Any technique may be used to make the determination of whether the new node patches the path expression, typically an XPath, in the current rule. As will be apparent to one skilled in the art, there are many ways of performing this comparison. One technique that may be used is to traverse a finite state machine that has been initialized to represent the paths specified in the set of sectioning rules using the current node path. Techniques for creating and using a finite state machine in this manner are disclosed in co-pending U.S. patent application Ser. No. 11/059,665, entitled EFFICIENT QUERIABILITY AND MANAGABILITY OF AN XML INDEX WITH PATH SUBSETTING, filed on Feb. 15, 2005, hereinafter referenced as the "Path Subsetting application", which is hereby incorporated by reference in its entirety. Techniques disclosed in the Path Subsetting application are described in more detail below.

In one embodiment, although not shown in FIG. 1, a section reference to the Action element's section table is also inserted into the root section table. Generally, whenever the process splits off to writing to a different section table, a section reference may be inserted or embedded in the current section table. In addition, whenever the process splits off to writing to a different section table, a new section (i.e. row) in the different section table is created, and data is written to that section. In addition, it is possible that the "new" section table determined in step 170 will be that same table that is currently being written to. This may happen, for example, if two rules specify the same section table. In this case, data will be written to a new section in the same (current) section table.

At step 174, the node tag "Action" is pushed onto the current node stack. Because "Action" is the top node of the stack, it is easily identified as the current node (i.e. the node currently being processed).

The process continues back to step 130, where XML data is written to the "current" section table until another start or end tag is encountered. In this example, since the current section table was set to "ACTION_TAB" in step 170, XML data is written to this table.

When the start tag <User> is encountered, the process of FIG. 1 will continue to step 135, in which it is determined that a new node tag has been encountered. Loop 140-150-155-158 is processed for the node "User." Since in this example there are no matching sectioning rules, the process will continue back to step 130, in which the XML data will continue to be written to the current section table, in this case ACTION_TAB. In this example, since the "User" node is nested within the "Action" node, and it has no matching sectioning rules, it is stored in the section table associated with the Action node.

XML data continues to be written to the current section table ACTION_TAB until the end tag for the "User" node is encountered. The process will then proceed to step 160, where the end tag just encountered is compared to the current node, which is the top node in the current node stack. In this example, the top of the current node stack, and therefore the current node, is "Action." Since "User" does not match, processing continues back to step 130, in which XML data continues to be written to the current section table (ACTION_TAB) until another start or end tag is encountered.

The end tag for the "Action" node is encountered next. Since this matches the current node at the top of the current node stack, the process continues from step 160 to step 162. Since the end of the node has been encountered, "Action" is no longer the current node, and therefore it is popped from the stack at step 162. After popping Action from the stack, in this example, the stack will then only have only node—the root node ("/").

At step 164, the current section table is set to the table identified in the sectioning rule associated with the current node at the top of the stack. In this example, as the root node is the current node, the current section table will be set back to ROOT_TAB. Preferably, the node stack (or alternatively some other mechanism) also keeps track of sections within a section table, so that data continues to be written to the same section of the ROOT_TAB that was being written to before the <Action> node was encountered.

At step 130, data is again written to the ROOT_TAB table. Since no more start tags are encountered, the remainder of the XML document po1.xml is written to the root section table.

After po1.xml is processed using the above example set of sectioning rules, the two tables ROOT_TAB and ACTION_TAB will respectively have the following XML data:

```
ROOT TAB
    <PurchaseOrder>
        <Reference>SBELL-2002100912333601PDT</Reference>
        <LineItems>
        </LineItems>
    </PurchaseOrder>
ACTION TAB
    <Action>
        <User>SVOLLMAN</User>
    </Action>
```

FIG. 1 illustrates only one example of a technique for flexibly sectioning a XML document using a set of sectioning rules. As will be apparently to one of skill in the art, there are many variations to the specific process shown in FIG. 1.

For example, instead of only tracking matching nodes on the node stack, every node encountered could be pushed onto the node stack. Consider the above example in which the node /PurchaseOrder/LineItems/Action/User is currently being processed. In this example variation of FIG. 1, the current node stack may have an entry for each of the four elements—PurchaseOrder, LineItems, Action and User. Of these, PurchaseOrder and Action are the only ones flagged as being section roots.

Querying Data sectioned by a Set of Sectioning Rules

After XML data has been sectioned and stored according to set of sectioning rules, XPath queries can be analyzed at compile time to determine which section tables need to be queried. A list of all possible section tables that need to be queried is generated. Section tables are added to this list only if the XPath rule specified in the set of sectioning rules that correspond to that section table is a superset of the query XPath. Thereafter at query execution time, only section tables in this generated list need to actually be queried. By only querying a subset of the section tables, query efficiency and performance can be dramatically improved.

For example, consider the query XPath:

/PurchaseOrder/LineItems/Address

In this example, only table ADDR_TABLE needs to be queried because the corresponding section-xpath "//Address" of above set of rules (PO1RULES) is a superset of this query XPath. Since no path expressions in the set of sectioning rules are a superset of this query XPath, the query can be evaluated using only ADDR_TABLE.

As another example, consider the set of sectioning rules below (ABCRULES):

```
/   -> ROOT_TAB
//a -> A_TAB
//b -> B_TAB
//c -> C_TAB
```

The input XPath query //a//d is received. In this example, the only section table that needs to be queried is A_TAB.

In one embodiment, at most one section table need ever be queried for a given query XPath. However, the querying of this one section table might involve "dereferencing" section references that occur within the data stored in that section table, which would result in data being fetched from other section tables.

For example, consider the XML document below that has been sectioned according to the set of rules above:

```
<foo>
    <a>
        <b>
            <d>    </d>
        </b>
    </a>
</foo>
```

While processing the section data for the <a> element in the above instance document, a section reference for the <b> element is encountered. At this point, according to the section reference will be dereferenced and the data for the <b> element will be fetched from the B_TAB. The <d> element will also be found while processing the section in B_TAB.

If multiple Xpaths are queried simultaneously, there could potentially be multiple section tables queried—one for each query XPath.

A finite state machine, such as the one disclosed in the Path Subsetting application and discussed briefly below, can be used to determine whether a query XPath matches a Sectioning Rule path expression. In one embodiment, the same finite state machine that is used for Path Subsetting can be used to determine whether a query XPath matches a sectioning Rule, and to generate the list of sectioning tables to be queried. Alternatively, a finite state machine can be initialized to the set of path expressions in the set of sectioning rules, and used only by query processing. Other methods that do not use a finite state machine could also be used to make this determination, and will be apparent to those skilled in the art.

Query performance is greatly improved by using the techniques of the present invention because only the relevant section tables are queried, whereas known techniques require an entire single large table to be queried. In addition, in the present invention, each section table is relatively small, and hence secondary indexes on section tables are also relatively smaller, leading to better query performance.

Updating Stored XML Documents Sectioned by a Set of Sectioning Rules

When a portion of an XML document stored in a relational database is updated using XPaths to identify the target node(s), the list of affected section tables can be generated as described above. In one embodiment, the same finite state machine that is used to generate a list of tables for querying can be used to generate a list of tables for updating.

Only relevant tables need to be accessed at run-time for updating, as opposed to a single large table. Since only a section of a document is typically updated, the amount of logging information is also reduced the techniques of the present invention are used. In addition, only the section to be updated (i.e. row) is locked, and therefore update operations can be more concurrent. That is, other users can concurrently update different sections of the same XML document.

Representing Path Expressions with a Finite State Machine

As described in the co-pending Path Subsetting application, a finite state machine is an "imaginary machine" or abstract computational model used by computer scientists to recognize and describe patterns. In automata theory, a symbol is a single thing, such as a letter. A word is a finite string formed by the concatenation of a number of symbols. An alphabet is a finite set of symbols, and a language is a set of words, formed by symbols in a given alphabet.

In general, a finite state machine consists of a finite set of states, a start state, an input alphabet and a transition function that maps input symbols and current states to a next state. The machine is started in the start state and reads in a string of symbols from its alphabet as input. It uses the transition function to determine its next state using its current state, and the symbol just read or the empty string. If the final state that the machine is in after all the symbols of the input have been read is an accept state, then the input is accepted as a word in the language that this particular machine recognizes.

In a finite state machine that uses non-deterministic automata, more than one transition from a given state is possible for a given input, including a transition to itself. In a non-deterministic finite automaton (NFA) state machine, states may or may not have a transition for each symbol in the alphabet, or can even have multiple transitions for a symbol. An NFA "accepts" a word if there exists at least one path from the start state to an accepting state. In addition, the transition function can be extended so that instead of taking just one symbol of the alphabet, it receives a string of symbols, and returns the state in which the NFA will stay after processing the input.

Finite state machines are a natural and effective way to represent and process many XML path expressions, in particular path expressions composed of a sequence of location steps, where each location step consists of an axis and a node test. An axis specifies the hierarchical relationship between the nodes, such as parent-child ('/'), or descendent-or-self ('//'). A node test is typically a name test, which can be an element name or a wildcard operator '*'. Path expressions that are composed of a sequence of location steps can be transformed into regular expressions for which a NFA can accept, or not accept, the language described by the expression. That is, an NFA can represent a path expression. In such a path expression NFA, location steps are mapped to states, and a transition from an active state is initiated when an element is found in the input that matches the transition function.

Significantly, multiple path expressions that are represented by individual NFAs can be combined into a single combined NFA that represents the set of path expressions. The use of a combined NFA allows a dramatic reduction in the total number of states needed to represent a set of path expressions as compared to using multiple individual NFAs to represent each path expression individually. In a combined NFA, the language accepted by the combined NFA is defined by all path expressions together.

Figure 4:
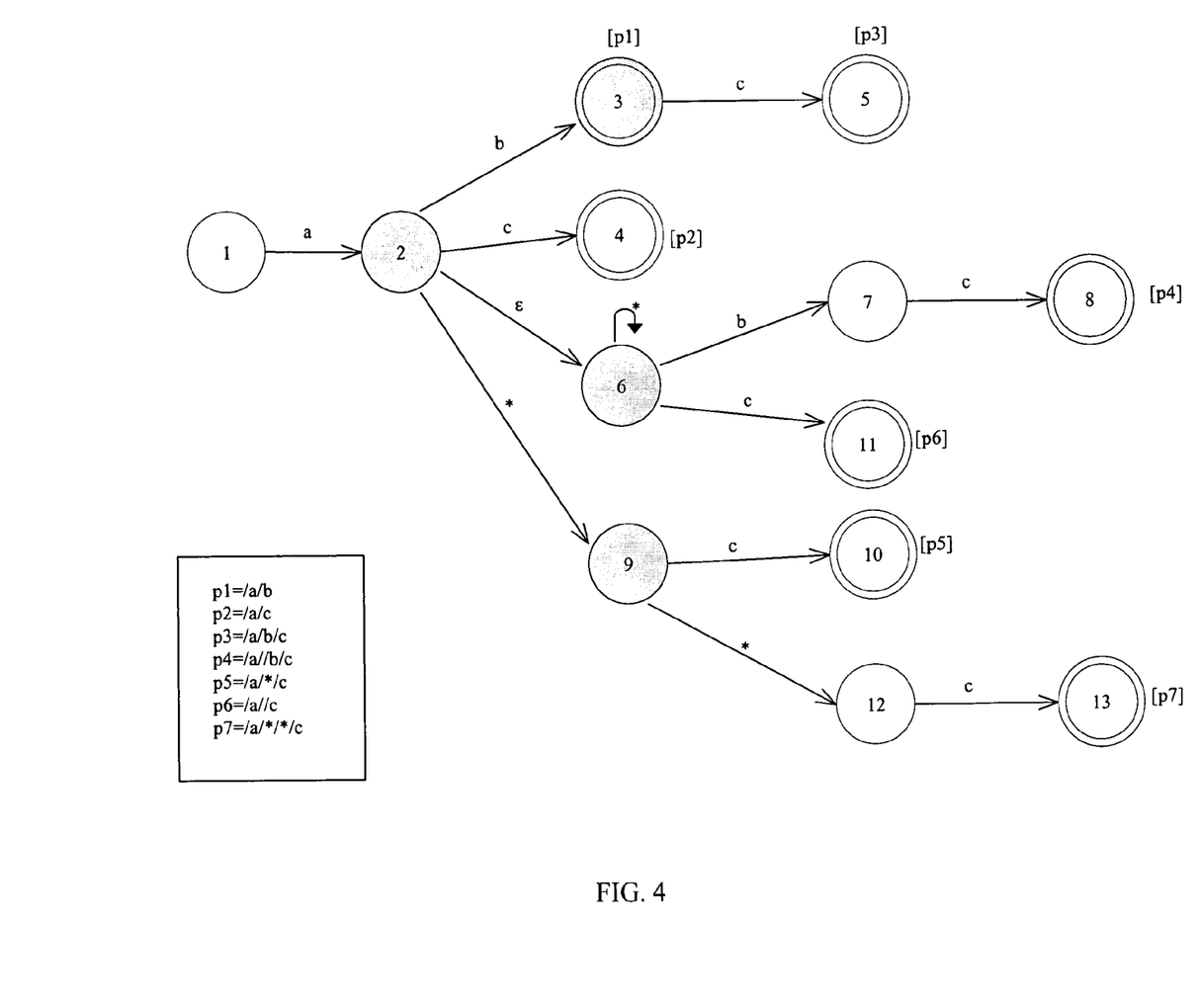
FIG. 4 is a directed graph illustrating a combined non-deterministic finite automaton (NFA) state machine for a set of path expressions.

A finite state machine can be conceptualized as a directed graph. In such a directed graph, a finite number of states are represented by circles, and transitions are represented by directed edges that show how the next symbol of input will cause the state to change. FIG. 4, reproduced from the Path Subsetting application, is an example of a directed graph illustrating a combined NFA state machine that represents a set of seven path expressions (p1-p7 shown in FIG. 4). In the directed graph of FIG. 4, two concentric circles denote an accepting state, each marked with the ID of accepted path expression. The symbol on each directed edge represents an input that triggers the transition. The wildcard symbol '*' matches any element. An edge marked by ϵ represents an empty input transition. Shaded circles represent states shared by path expressions. As shown by the combined NFA of FIG. 4, the common prefixes of all the path expressions are shared.

The NFA of FIG. 4 contains multiple accepting states, corresponding to the accepting states of the individual path expressions. While each path expression in the combined NFA has only a single accepting state, the single combined NFA represents multiple path expressions, and has multiple accepting states.

In the context of flexibly sectioning XML documents using a set of user-specified rules, the language recognized by a finite state machine is the set of paths specified in the user-specified sectioning rules. Although any type of finite state machine can be used to store the rules, a state machine that uses a combined NFA is briefly described herein, and is disclosed in more detail in the Path Subsetting application.

In one embodiment, when a user enters a set of sectioning rules, a combined NFA is created for the set of paths specified in the set of rules. This NFA can then be used to determine whether a given path expression matches a path in the set of rules. The NFA can also be used to generate a list of section tables for evaluating a query or updating stored XML data.

Many different types of data structures may be used to implement and store a combined NFA. Generally, to implement a path expression NFA, a data structure is created for each state, the structure containing (1) an ID of the state; (2) type information (e.g. accepting, '//'-child, ϵ, etc.); (3) hash table(s) that contain all legal transitions from that state; and (4) for accepting states, a list of IDs of corresponding path expressions.

Figure 3A:
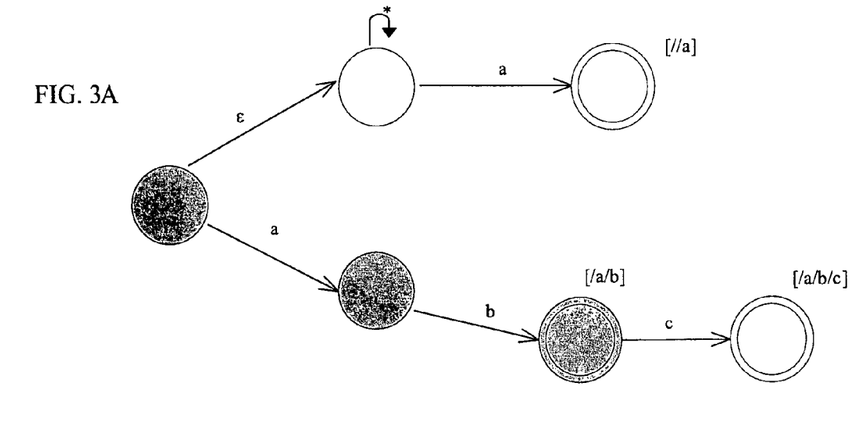
FIG. 3A is a directed graph illustrating a combined NFA path state machine.
Figure 3B:
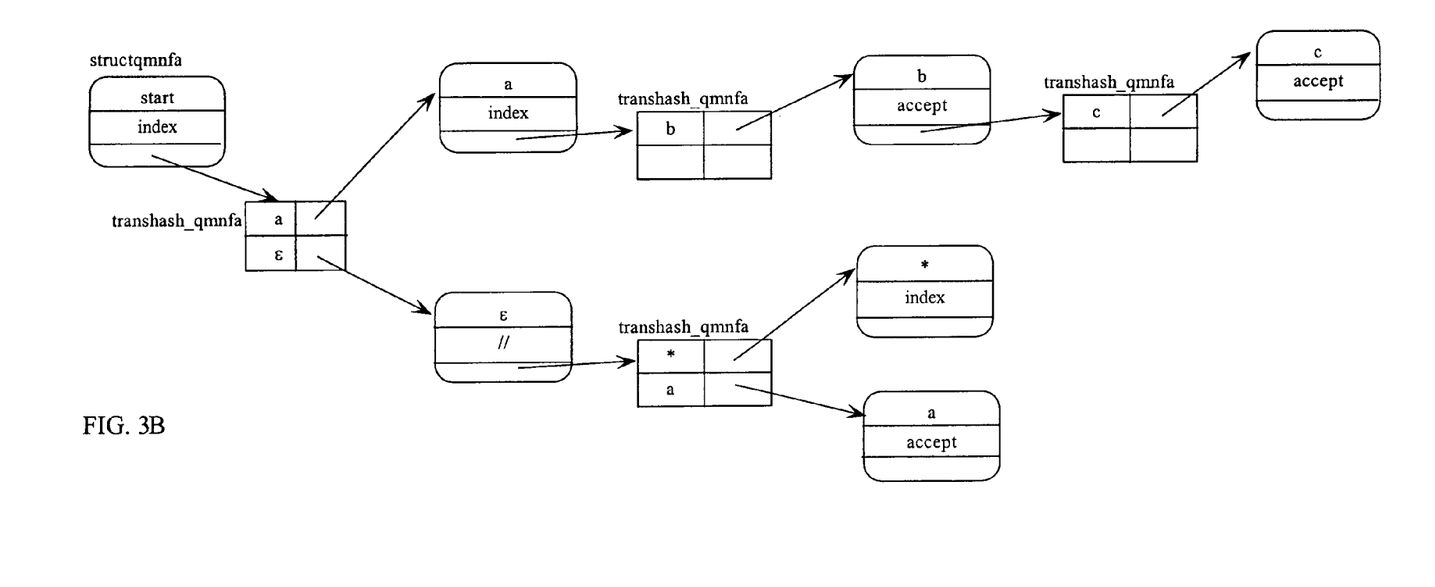
FIG. 3B is a diagram illustrating linked data structures for implementing the combined NFA of FIG. 3A.

FIG. 3A, reproduced from the Path Subsetting application, illustrates a directed graph of a combined NFA that represents the set of path expressions /a/b, //a and /a/b/c. FIG. 3B illustrates a linked list of data structures corresponding to the directed graph of FIG. 3A. The Path Subsetting application describes data structures and methods of creating a finite state machine in more detail.

Once created, a combined NFA that represents a set of path expressions used in a set of sectioning rules can be used to quickly and efficiently determine (1) how to section a given path in an XML document; (2) what section tables need to be queried in order to execute a given query; and/or (3) what section tables need to be updated to execute an update command by determining whether a given path is accepted by the combined NFA.

For example, the combined NFA generated for a set of sectioning rules may be traversed using an input query XPath to determine which section table needs to be queried. The combined NFA will execute transitions based on its input, and return all matched XPaths (if any) on each input. Upon receiving a list of matched XPaths from the state machine, it can easily be determined which rule occurs first in the list. In one embodiment, traversing the NFA for an input query XPath will return an identification of the section table that corresponds to the first occurring sectioning rule among the "accepted" states of the traversal of the NFA.

Although described using techniques disclosed in the Path Subsetting application, any type of finite state machine, or any other technique known to those skilled in the art, could be determine whether a given path matches a particular sectioning rule, and use of an NFA as disclosed in the Path Subsetting application is not required.

The XML Index

U.S. patent application Ser. No. 10/884,311, entitled INDEX FOR ACCESSING XML DATA, filed on Jul. 2, 2004, (hereinafter the "XML Index application"), previously incorporated by reference, describes various embodiments of an index that may be used to efficiently access XML documents managed by a relational database server, based on XPath queries. Such an index shall be referred to herein as an XML index.

An XML index as described in the XML Index application may be used to process XPath queries regardless of the format and data structures used to store the actual XML data (the "base structures"). As described in the XML Index application, an XML index is a logical index that results from the cooperative use of a path index, a value index, and an order index. The path index provides the mechanism to lookup nodes based on simple (navigational) path expressions. The value index provides the lookup based on value equality or range. The order index associates hierarchical ordering information with indexed nodes. The order index is used to determine parent-child, ancestor-descendant and sibling relationships between XML nodes.

When the user submits a query involving XPaths (as predicate or fragment identifier), the XPath statement is decomposed into a SQL query that accesses the XML index table(s). The generated query typically performs a set of path, value and order-constrained lookups and merges their results appropriately.

According to one embodiment, a logical XML index includes a PATH table, and a set of secondary indexes. Each indexed XML document may include many indexed nodes. The PATH table contains one row per indexed node. For each indexed node, the row in the PATH table for the node contains various pieces of information associated with the node.

The information contained in the PATH table includes (1) a PATHID that indicates the path to the node, (2) "location data" for locating the fragment data for the node within the base structures, and (3) "hierarchy data" that indicates the position of the node within the structural hierarchy of the XML document that contains the node. Each of these types of information is described in greater detail in the XML Index application.

The structure of an XML document establishes parent-child relationships between the nodes within the XML document. The "path" for a node in an XML document reflects the series of parent-child links, starting from a "root" node, to arrive at the particular node. For example, the path to the "User" node in po2.xml is /PurchaseOrder/Actions/Action/User, since the "User" node is a child of the "Action" node, the "Action" node is a child of the "Actions" node, and the "Actions" node is a child of the "PurchaseOrder" node.

The set of XML documents that an XML index indexes is referred to herein as the "indexed XML documents". According to one embodiment, an XML index may be built on all of the paths within all of the indexed XML documents. Alternatively, an XML index may be built on a specified subset of the paths within the indexed XML documents.

According to one embodiment, each of the indexed XML paths is assigned a unique path identifier ("PATHID"). For example, the paths that exist in po1.xml and po2.xml may be assigned PATHIDs as illustrated in the following table:

| PATHID | PATH |
|---|---|
| 1 | /PurchaseOrder |
| 2 | /PurchaseOrder/Reference |
| 3 | /PurchaseOrder/Actions |
| 4 | /PurchaseOrder/Actions/Action |
| 5 | /PurchaseOrder/Actions/Action/User |

Various techniques may be used to identify paths and assign PATHIDs to paths. For example, a user may explicitly enumerate paths, and specify corresponding PATHIDs for the paths thus identified. Alternatively, the database server may parse each XML document as the document is added to the set of indexed XML documents. During the parsing operation, the database server identifies any paths that have not already been assigned a PATHID, and automatically assigns new PATHIDs to those paths. The PATHID-to-path mapping may be stored within the database in a variety of ways. According to one embodiment, the PATHID-to-path mapping is stored as metadata separate from the XML indexes themselves.

The location data associated with a node indicates (1) where the XML document that contains the node resides within the base structures, and (2) where the XML fragment that corresponds to the node is located within the stored XML document. Thus, the nature of the location data will vary from implementation to implementation based on the nature of the base structures.

For the purpose of explanation, it shall be assumed that (1) the base structures are tables within a relational database, and (2) each indexed XML document is stored in a corresponding row of a base table. In such a context, the location data for a node may include, for example, (1) the identifier of the row ("RID") in the base table in which the XML document containing the node is stored, and (2) a locator that provides fast access within the stored XML document, to the fragment data that corresponds to the indexed node.

The PATH table row for a node also includes information that indicates where the node resides within the hierarchical structure of the XML document containing the node. Such hierarchical information is referred to herein as the "Order-Key" of the node.

According to one embodiment, the hierarchical order information is represented using a Dewey-type value. Specifically, in one embodiment, the OrderKey of a node is created by appending a value to the OrderKey of the node's immediate parent, where the appended value indicates the position, among the children of the parent node, of that particular child node.

For example, assume that a particular node D is the child of a node C, which itself is a child of a node B that is a child of a node A. Assume further that node D has the OrderKey 1.2.4.3. The final "3" in the OrderKey indicates that the node D is the third child of its parent node C. Similarly, the 4 indicates that node C is the fourth child of node B. The 2 indicates that Node B is the second child of node A. The leading 1 indicates that node A is the root node (i.e. has no parent).

As mentioned above, the OrderKey of a child may be easily created by appending to the OrderKey of the parent a value that corresponds to the number of the child. Similarly, the OrderKey of the parent is easily derived from the OrderKey of the child by removing the last number in the OrderKey of the child.

According to one embodiment, the composite numbers represented by each OrderKey are converted into byte-comparable values, so that a mathematical comparison between two OrderKeys indicates the relative position, within the structural hierarchy of an XML document, of the nodes to which the OrderKeys correspond.

For example, the node associated with the OrderKey 1.2.7.7 precedes the node associated with the OrderKey 1.3.1 in the hierarchical structure of an XML document. Thus, the database server uses a conversion mechanism that converts OrderKey 1.2.7.7 to a first value, and to convert OrderKey 1.3.1 to a second value, where the first value is less than the second value. By comparing the second value to the first value, the database server can easily determine that the node associated with the first value precedes the node associated with the second value. Various conversion techniques may be used to achieve this result.

The Order Key and PathID can also be used as fragment identifiers, and stored in section tables.

Path Table Example

According to one embodiment, the PATH table includes columns defined as specified in the following table:

| Column Name | Datatype | Description |
| --- | --- | --- |
| PATHID | RAW(8) | ID for the path token. Each distinct path e.g./a/b/c is assigned a unique id by the system. |
| RID | UROWID/ROWID | Identifier of the row in base table that stores the XML document containing the node. |
| ORDER_KEY | RAW(100) | Dewey OrderKey for the node e.g. 3.21.5 to indicate 5$^{th}$ child of 21$^{st}$ child of 3$^{rd}$ child of root. |
| LOCATOR | RAW(100) | Information corresponding to the starting position for the fragment. This is used during fragment extraction. |
| VALUE | RAW(2000)/BLOB | Value of the node in case of attributes and simple elements. The type can be specified by the user (as well as the size of the RAW column) |

As explained above, the PATHID is an identifier assigned to the node, and uniquely represents a fully expanded path to the node. The ORDER_KEY is a system representation of the Dewey ordering number associated with the node. The internal representation of the OrderKey also preserves document ordering.

The following table is an example of a PATH table that (1) has the columns described above, and (2) is populated with entries for po1.xml and po2.xml. Specifically, each row of the PATH table corresponds to an indexed node of either po1.xml or po2.xml. In this example, it is assumed that po1.xml and po2.xml are respectively stored at rows R1 and R2 of a base table, and that all nodes of po1.xml and po2.xml are indexed XML paths.

| | | | POPULATED PATH TABLE | | |
| --- | --- | --- | --- | --- | --- |
| rowid | PATHID | RID | ORDER_KEY | LOCATOR | VALUE |
| 1 | 1 | R1 | 1 | 1, 350 | |
| 2 | 2 | R1 | 1.1 | | SBELL-2002100912333601PDT |
| 3 | 3 | R1 | 1.2 | 64, 56 | |
| 4 | 4 | R1 | 1.2.1 | 73, 37 | |
| 5 | 5 | R1 | 1.2.1.1 | | SVOLLMAN |
| 6 | 1 | R2 | 1 | 1, 400 | |
| 7 | 2 | R2 | 1.1 | | ABEL-20021127121040897PST |
| 8 | 3 | R2 | 1.2 | 63, 89 | |
| 9 | 4 | R2 | 1.2.1 | 72, 36 | |
| 10 | 5 | R2 | 1.2.1.1 | | ZLOTKEY |
| 11 | 4 | R2 | 1.2.2 | 109, 33 | |
| 12 | 5 | R2 | 1.2.2.1 | | KING |

In this example, the rowid column stores a unique identifier for each row of the PATH table. Depending on the database system in which the PATH table is created, the rowid column may be an implicit column. For example, the disk location of a row may be used as the unique identifier for the row.

Further details regarding the creation and use of an XML Index are disclosed in the XML Index application.

Hardware Overview

Figure 2:
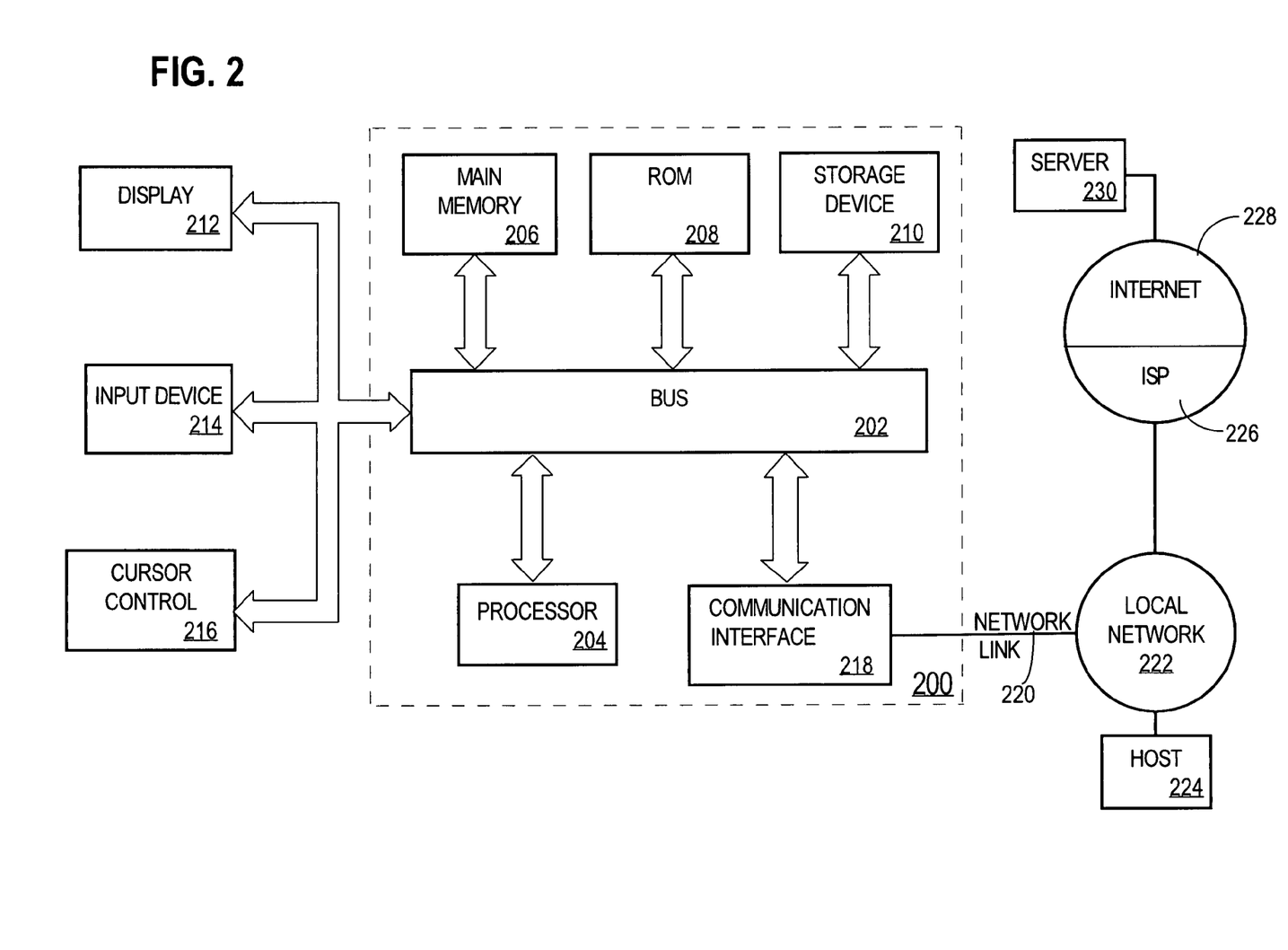
FIG. 2 is a block diagram of a system upon which the techniques described herein may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 126 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of sectioning an XML document having one or more nodes, said method comprising the computer-implemented steps of:

obtaining a set of sectioning rules;

wherein each sectioning rule in the set of sectioning rules comprises matching criteria and a table identifier that identifies a database table in which a fragment of the XML document that matches the matching criteria is to be persistently stored;

receiving an XML document to be stored in a relational database system;

based on the set of sectioning rules, identifying one or more database tables in the relational database system in which to store fragments of the XML document;

storing the fragments of the XML document in the one or more database tables, wherein storing the fragments of the XML document comprises selectively sectioning the XML document based on the set of sectioning rules by performing steps that include:

for each particular fragment of the XML document that matches particular matching criteria included in a particular sectioning rule:

determining a particular database table of the one or more database tables that is identified by a particular table identifier included in the particular sectioning rule; and storing the particular fragment in the particular database table.

2. The method of claim 1 wherein the step of identifying is performed within a database server of the relational database system.

3. The method of claim 1, wherein the XML document does not conform to a defined schema.

4. The method of claim 1, further comprising storing a fragment identifier with each fragment in the identified database table for the fragment.

5. The method of claim 1, wherein the matching criteria in said each sectioning rule comprises a path expression.

6. The method of claim 1, wherein matching criteria in a first sectioning rule comprises a first path expression and a first table identifier, and matching criteria in a second sectioning rule comprises a second path expression and the first table identifier.

7. The method of claim 1, wherein the step of identifying the one or more database tables comprises:
   identifying a rule containing matching criteria that matches a node as a matching rule; and
   identifying a storage location for the node as the database table associated with the table identifier in the matching rule.

8. The method of claim 7, wherein the step of identifying a rule as a matching rule comprises:
   determining that a rule, in the set of sectioning rules, matches a node if the matching criteria in the rule includes a path expression that is a superset of the node's path.

9. The method of claim 7, wherein the matching criteria comprises a path expression, said method additionally comprising the step of:
   initializing a finite state machine to represent path expressions in the set of sectioning rules; and
   wherein the step of identifying a rule as a matching rule comprises traversing the finite state machine to identify a rule that includes a path expression that matches the node's path.

10. The method of claim 1, wherein the set of sectioning rules are ordered, and the step of identifying the one or more database tables comprises the steps of:
   (a) setting a first rule in the set of sectioning rules as a current rule;
   (b) determining whether matching criteria in the current rule matches a node's path;
   (c) if matching criteria in the current rule does not match the node's path, then setting the current rule to a next rule in the set of sectioning rules, and repeating steps (b) and (c); and
   (d) if matching criteria in the current rule matches the node's path, then identifying the storage location for the node as the database table associated with the table identifier in the current rule.

11. The method of claim 1, wherein the received XML document is an updated version of an XML document already stored in the relational database system, the method additionally comprising the steps of:
   receiving an update command, said command comprised of at least one path-based expression;
   based on the set of sectioning rules, generating a list of database tables that correspond to the at least one path-based expression in the update command; and
   executing the update command using only the database tables in the generated list of database tables.

12. The method of claim 1, wherein the step of obtaining a set of sectioning rules comprises receiving the set of sectioning rules from a user.

13. The method of claim 1, wherein the step of obtaining a set of sectioning rules comprises obtaining the set of sectioning rules from annotations in an XML schema.

14. A method of evaluating a query in a relational database system that stores XML data sectioned from XML documents in one or more section tables of a relational database according to a set of sectioning rules, said method comprising the computer-implemented steps of:
   receiving a query, said query comprised of at least one path expression;
   generating a list of section table identifiers that identify section tables in the relational database, each said section table identifier coffesponding to at least one rule in the set of sectioning rules that matches the at least one path expression; and
   evaluating the query using only section tables identified in the generated list;
   wherein said set of sectioning rules are rules that were used to determine where to store said XML data sectioned from said XML documents when said XML documents were initially selectively sectioned based on said set of sectioning rules and stored in the one or more section tables of the relational database;
   wherein each sectioning rule in said set of sectioning rules comprises matching criteria and a table identifier that identifies a section table in which a fragment of an XML document that matched the matching criteria was persistently stored by:
      determining the section table based on the table identifier included in the sectioning rule; and
      storing the fragment of the XML document in the section table.

15. The method of claim 14 wherein the at least one path expression is an XPath query.

16. The method of claim 14 wherein the step of generating a list of section table identifiers comprises the steps of:
   identifying at least one matching rule that includes matching criteria that matches the at least one path expression;
   identifying the section table for each identified matching rule; and
   generating the list comprised of identifiers for each identified section table.

17. The method of claim 16, further comprising the step of:
   initializing a finite state machine to represent path expressions in the set of sectioning rules; and
   wherein the step of identifying at least one matching rule comprises traversing the finite state machine to identify at least one rule that includes matching criteria that matches the at least one path expression.

18. A computer-readable storage medium storing one or more sequences of instructions for sectioning an XML document having one or more nodes, wherein the one or more sequences of instructions when executed by one or more processors cause the one or more processors to perform the steps of:
   obtaining a set of sectioning rules;
   wherein each sectioning rule in the set of sectioning rules comprises matching criteria and a table identifier that identifies a database table in which a fragment of the XML document that matches the matching criteria is to be persistently stored;
   receiving an XML document to be stored in a relational database system;
   based on the set of sectioning rules, identifying one or more database tables in the relational database system in which to store fragments of the XML document;
   storing the fragments of the XML document in the one or more database tables, wherein storing the fragments of the XML document comprises selectively sectioning the XML document based on the set of sectioning rules by performing steps that include:
   for each particular fragment of the XML document that matches particular matching criteria included in a particular sectioning rule:
      determining a particular database table of the one or more database tables that is identified by a particular table identifier included in the particular sectioning rule; and storing the particular fragment in the particular database table.

19. The computer-readable storage medium of claim 18, wherein the instructions that cause the one or more processors to perform the step of identifying are included within the executable code of a database server of the relational database system.

20. The computer-readable storage medium of claim 18, wherein the XML document does not conform to a defined schema.

21. The computer-readable storage medium of claim 18, wherein the one or more sequences of instructions further comprises instructions which, when executed by the one or more processors, cause the one or more processors to perform the step of storing a fragment identifier with each fragment in the identified database table for the fragment.

22. The computer-readable storage medium of claim 18, wherein the matching criteria in said each sectioning rule comprises a path expression.

23. The computer-readable storage medium of claim 18, wherein matching criteria in a first sectioning rule comprises a first path expression and a first table identifier, and matching criteria in a second sectioning rule comprises a second path expression and the first table identifier.

24. The computer-readable storage medium of claim 18, wherein the instructions that cause the one or more processors to perform the step of identifying the one or more database tables comprise instructions which, when executed by the one or more processors, cause the one or more processors to perform the steps of:
    identifying a rule containing matching criteria that matches a node as a matching rule; and
    identifying a storage location for the node as the database table associated with the table identifier in the matching rule.

25. The computer-readable storage medium of claim 24, wherein the instructions that cause the one or more processors to perform the step of identifying a rule as a matching rule further comprise instructions which, when executed by the one or more processors, cause the one or more processors to perform the step of:
    determining that a rule, in the set of sectioning rules, matches a node if the matching criteria in the rule includes a path expression that is a superset of the node's path.

26. The computer-readable storage medium of claim 24, wherein the matching criteria comprises a path expression, and wherein the one or more sequences of instructions further comprise instructions which, when executed by the one or more processors, cause the one or more processors to perform the step of:
    initializing a finite state machine to represent path expressions in the set of sectioning rules; and
    wherein the instructions that cause the one or more processors to perform the step of identifying a rule as a matching rule comprise instructions which, when executed by the one or more processors, cause the one or more processors to perform the step of traversing the finite state machine to identify a rule that includes a path expression that matches the node's path.

27. The computer-readable storage medium of claim 18, wherein the set of sectioning rules are ordered, and wherein the instructions that cause the one or more processors to perform the step of identifying the one or more database tables comprise instructions which, when executed by the one or more processors, cause the one or more processors to perform the steps of:

(a) setting a first rule in the set of sectioning rules as a current rule;
(b) determining whether matching criteria in the current rule matches a node's path;
(c) if matching criteria in the current rule does not match the node's path, then setting the current rule to a next rule in the set of sectioning rules, and repeating steps (b) and (c); and
(d) if matching criteria in the current rule matches the node's path, then identifying the storage location for the node as the database table associated with the table identifier in the current rule.

28. The computer-readable storage medium of claim 18, wherein the received XML document is an updated version of an XML document already stored in the relational database system, and wherein the one or more sequences of instructions further comprise instructions which, when executed by the one or more processors, cause the one or more processors to perform the steps of:
    receiving an update command, said command comprised of at least one path-based expression;
    based on the set of sectioning rules, generating a list of database tables that correspond to the at least one path-based expression in the update command; and
    executing the update command using only the database tables in the generated list of database tables.

29. The computer-readable storage medium of claim 18, wherein the instructions that cause the one or more processors to perform the step of obtaining a set of sectioning rules comprise instructions which, when executed by the one or more processors, cause the one or more processors to perform the step of receiving the set of sectioning rules from a user.

30. The computer-readable storage medium of claim 18, wherein the instructions that cause the one or more processors to perform the step of obtaining a set of sectioning rules comprise instructions which, when executed by the one or more processors, cause the one or more processors to perform the step of obtaining the set of sectioning rules from annotations in an XML schema.

31. A computer-readable storage medium storing one or more sequences of instructions for evaluating a query in a relational database system that stores XML data sectioned from XML documents in one or more section tables of a relational database according to a set of sectioning rules, wherein the one or more sequences of instructions when executed by one or more processors cause the one or more processors to perform the steps of:
    receiving a query, said query comprised of at least one path expression;
    generating a list of section table identifiers that identify section tables in the relational database, each said section table identifier coffesponding to at least one rule in the set of sectioning rules that matches the at least one path expression; and
    evaluating the query using only section tables identified in the generated list;
    wherein said set of sectioning rules are rules that were used to determine where to store said XML data sectioned from said XML documents when said XML documents were initially selectively sectioned based on said set of sectioning rules and stored in the one or more section tables of the relational database;
    wherein each sectioning rule in said set of sectioning rules comprises matching criteria and a table identifier that identifies a section table in which a fragment of an XML document that matched the matching criteria was persistently stored by:

determining the section table based on the table identifier included in the sectioning rule; and storing the fragment of the XML document in the section table.

32. The computer-readable storage medium of claim 31, wherein the at least one path expression is an XPath query.

33. The computer-readable storage medium of claim 31, wherein the instructions that cause the one or more processors to perform the step of generating a list of section table identifiers comprise instructions which, when executed by the one or more processors, cause the one or more processors to perform the steps of:

identifying at least one matching rule that includes matching criteria that matches the at least one path expression;

identifying the section table for each identified matching rule; and generating the list comprised of identifiers for each identified section table.

34. The computer-readable storage medium of claim 33, wherein the one or more sequences of instructions further comprise instructions which, when executed by the one or more processors, cause the one or more processors to perform the step of:

initializing a finite state machine to represent path expressions in the set of sectioning rules; and wherein the instructions that cause the one or more processors to perform the step of identifying at least one matching rule comprise instructions which, when executed by the one or more processors, cause the one or more processors to perform the step of traversing the finite state machine to identify at least one rule that includes matching criteria that matches the at least one path expression.

* * * * *

UNITED STATES PATENT AND TRADEMARK OFFICE
CERTIFICATE OF CORRECTION

| | | |
|---|---|---|
| PATENT NO. | : 7,461,074 B2 | Page 1 of 1 |
| APPLICATION NO. | : 11/083828 | |
| DATED | : December 2, 2008 | |
| INVENTOR(S) | : Murthy et al. | |

It is certified that error appears in the above-identified patent and that said Letters Patent is hereby corrected as shown below:

On the title page, item [56]:
On page 3, in column 1, under "Other Publications", line 11, above "Shankar Pal et al.," insert -- GIRARDOT ET AL., "Millau: an encoding format for efficient representation and exchange of XMLover the Web", IBM Almaden Research Center, 24 pages. --.

In column 1, line 28, delete "extensible" and insert -- eXtensible --, therefor.

In column 5, line 3, after "used" insert -- . --.

In column 18, line 41, in claim 1, after "document;" insert -- and --.

In column 20, line 1, in claim 14, delete "coffesponding" and insert -- corresponding --, therefor.

In column 20, line 55, in claim 18, after "document;" insert -- and --.

In column 22, line 52, in claim 31, delete "coffesponding" and insert -- corresponding --, therefor.

Signed and Sealed this

Twentieth Day of April, 2010

David J. Kappos
*Director of the United States Patent and Trademark Office*